US008225115B2

(12) United States Patent
Cao

(10) Patent No.: US 8,225,115 B2
(45) Date of Patent: Jul. 17, 2012

(54) SYSTEM AND METHOD FOR TESTING HYBRID SLEEP MODES OF AN ELECTRONIC DEVICE

(75) Inventor: Xiang Cao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 265 days.

(21) Appl. No.: 12/770,758

(22) Filed: Apr. 30, 2010

(65) Prior Publication Data

US 2011/0107118 A1   May 5, 2011

(30) Foreign Application Priority Data

Oct. 30, 2009   (CN) .......................... 2009 1 0309102

(51) Int. Cl.
   *G06F 1/26* (2006.01)
(52) U.S. Cl. ........................... 713/300; 702/117; 714/32
(58) Field of Classification Search ............. 324/763.01; 702/117; 713/300; 714/32
   See application file for complete search history.

(56) References Cited

U.S. PATENT DOCUMENTS

| 7,213,172 B2 * | 5/2007 | Iovin et al. ...................... 714/36 |
| 7,987,389 B2 * | 7/2011 | Lai .................................. 714/32 |
| 2005/0278560 A1 * | 12/2005 | Wu ................................ 713/320 |

* cited by examiner

*Primary Examiner* — Albert Wang
(74) *Attorney, Agent, or Firm* — Altis Law Group, Inc.

(57) ABSTRACT

A system and method for testing hybrid sleep modes of an electronic device sets a switch time of switching a suspending to RAM (S3) sleep mode to a suspending to disk (S4) sleep mode. A computer sends a power management event (PME) signal to control the electronic device to be in the S3 sleep mode. If a system time of the electronic device reaches a switch time of switching the S3 sleep mode to the S4 sleep mode, the computer detects if the electronic device is in the S4 sleep mode. If the electronic device is in the S4 sleep mode, the computer sends an awake signal to control the electronic device to be in a normal work mode. A display of the computer displays that the electronic device is in the S3 sleep mode, the S4 mode, or the normal work mode.

18 Claims, 3 Drawing Sheets

SYSTEM AND METHOD FOR TESTING HYBRID SLEEP MODES OF AN ELECTRONIC DEVICE

BACKGROUND

1. Technical Field

Embodiments of the present disclosure relate to test technology, and more particularly to a system and a method for testing hybrid sleep modes of an electronic device.

2. Description of Related Art

Hybrid sleep modes are a method of putting a device to sleep and may include multiple sleep modes. Operating systems, such as WINDOWS VISTA and WINDOWS 7 include hybrid sleep modes. The hybrid sleep modes include a suspending to RAM (S3) sleep mode or a suspending to disk (S4) sleep mode. The S3 sleep mode can be switched to the S4 sleep mode automatically. Because statuses of the electronic device are ostensibly the same when the electronic device is in the S3 sleep mode or the S4 sleep mode, people cannot determine if the sleep mode has been switched.

What is needed, therefore, is an improved system and method for testing hybrid sleep modes of an electronic device.

DETAILED DESCRIPTION

The processes described may be embodied in, and fully automated via, functional modules executed by one or more general purpose processors. The functional modules may be stored in any type of computer-readable medium or other computer storage device. Some or all of the methods may alternatively be embodied in specialized computer hardware or communication apparatus.

Figure 1:
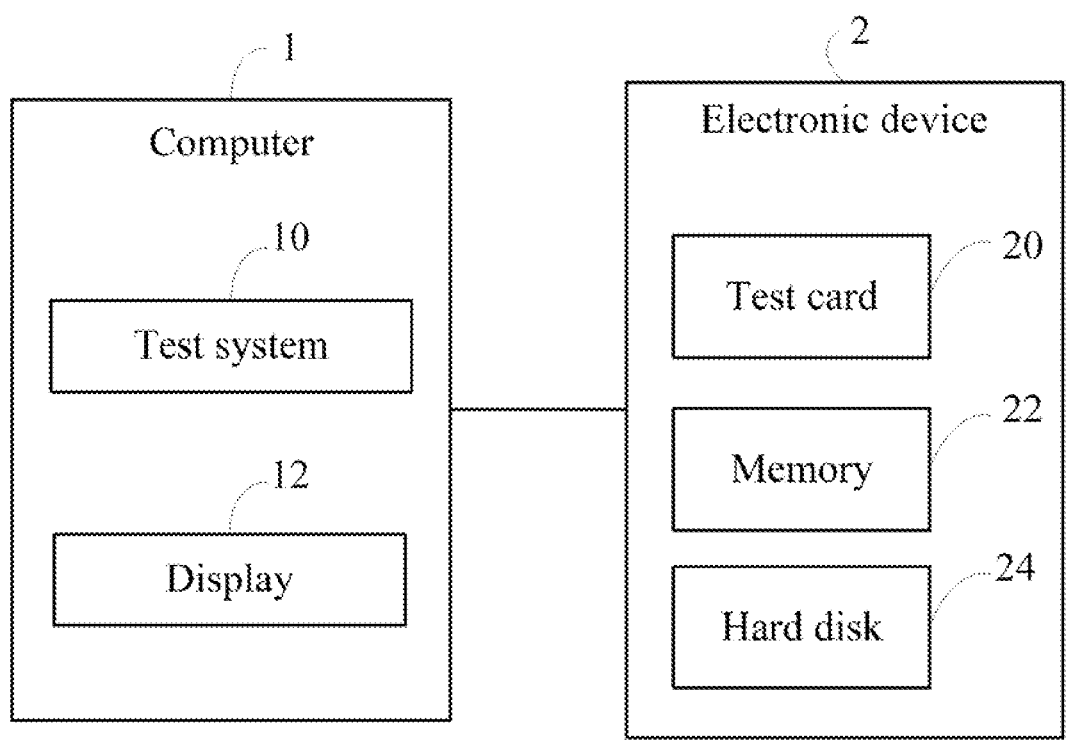
FIG. 1 is a block diagram of one embodiment of a computer comprising a test system.

FIG. 1 is a block diagram of one embodiment of a computer 1 comprising a test system 10. The test system 10 may be used to test hybrid sleep modes of an electronic device 2 connected to the computer 1. In one embodiment, the computer 1 may be a desktop computer. The electronic device 2 may be a notebook computer, for example. The computer 1 includes a display 12. The electronic device 2 includes a test card 20, a memory 22, and a hard disk 24. In one embodiment, the memory 22 may be a RAM, or a ROM. The test card 20 may adapt to peripheral component interconnect (PCI) standard and PCI express (PCI-E) standard.

The computer 1 sends a power management event (PME) signal to the test card 20 to control the electronic device 2 to be in a hybrid sleep mode. In one embodiment, the hybrid sleep mode may be a suspending to RAM (S3) sleep mode or a suspending to disk (S4) sleep mode. When the electronic device 2 is in the S3 sleep mode, current work status of the electronic device 2 is stored in the memory 22 of the electronic device 2 and all of the other hardware of the electronic device 2 stop working. When the electronic device 2 is in the S4 sleep mode, current work status of the electronic device 2 is stored in the hard disk 24 of the electronic device 2 and the other hardware of the electronic device 2 stop working. Power consumption of the electronic device 2 in the S3 sleep mode is lower than in the S4 sleep mode.

Figure 2:
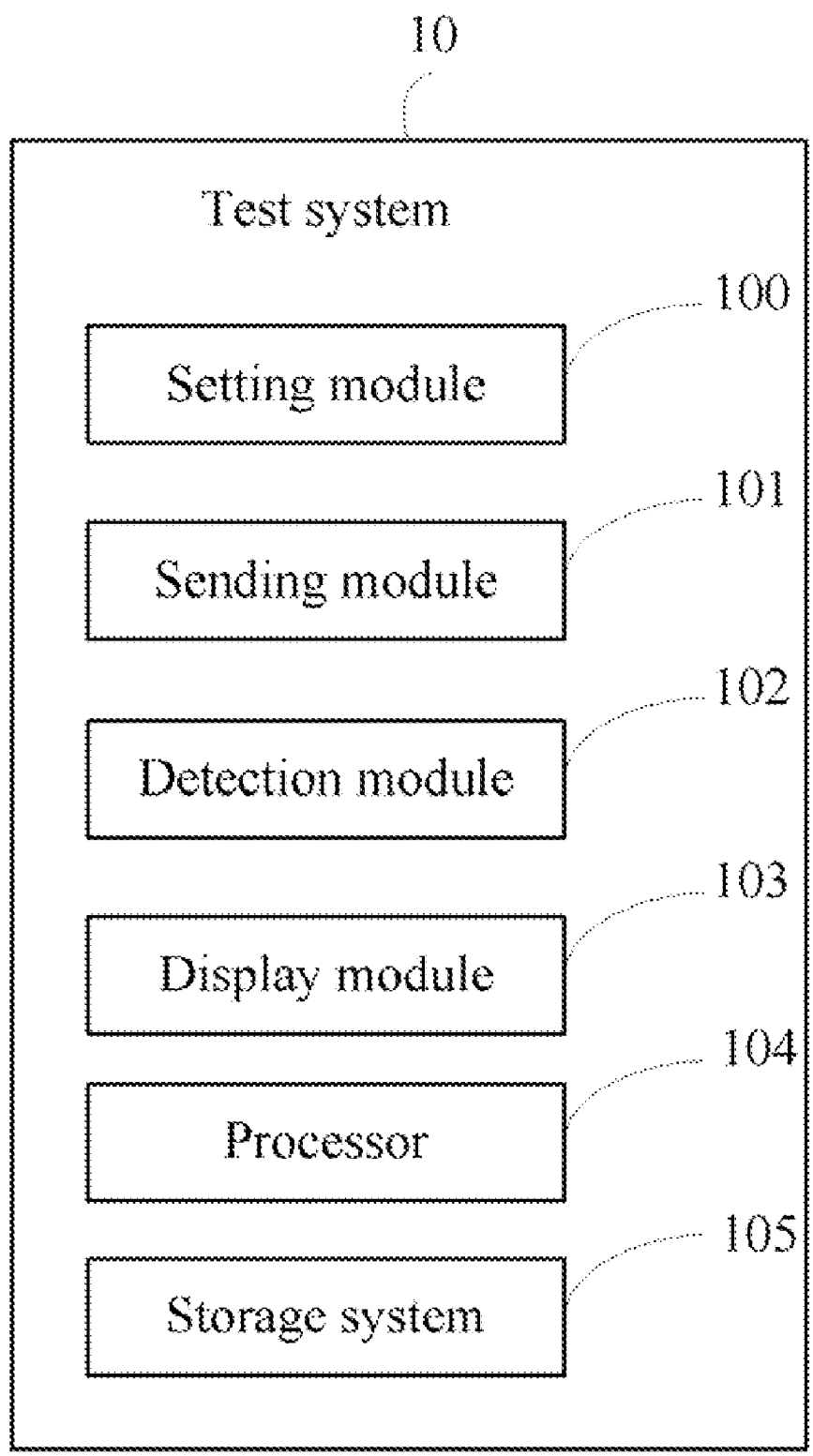
FIG. 2 is a block diagram showing functional modules of the test system of FIG. 1.

FIG. 2 is a block diagram of functional modules of the test system 10 of FIG. 1. In one embodiment, the test system 10 may include a setting module 100, a sending module 101, a detection module 102, and a display module 103. The test system 10 further includes a processor 104 and a storage system 105. It may be understood that one or more specialized or general purpose processors, such as the processor 104, may be used to execute one or more computerized codes of the function modules 100-103. The one or more computerized codes of the functional modules 100-103 may be stored in the storage system 105.

The setting module 100 sets test parameters of the hybrid sleep modes of the electronic device 2. In one embodiment, the test parameters may include, but are not limited to, a communication port of the electronic device 2, a time it takes to switch from the S3 sleep mode to the S4 sleep mode (hereinafter, "a switch time"), a number of times of repeated testing of the hybrid sleep modes, and an interval of the repeated testing of the hybrid sleep modes. In one embodiment, the number of times of repeated testing of the hybrid sleep modes may be 2000 times and the interval may be 30 seconds. It should be understood that "the interval of repeated testing" is the time between two tests.

The sending module 101 sends the PME signal to the test card 20 to control a power supply voltage of the electronic device 2 to be approximately equal a voltage of the S3 sleep mode. In one embodiment, the voltage of the S3 sleep mode may be about 3.3V.

The detection module 102 controls the test card 20 to detect if the electronic device 2 is in the S3 sleep mode after receiving a voltage signal from the electronic device 2. In one embodiment, if the voltage signal represents that the voltage of the electronic device 2 is approximately equal the voltage of the S3 sleep mode, the detection module 102 determines that the S3 sleep mode has been detected. If the voltage signal represents that the voltage of the electronic device 2 is not equal the voltage of the S3 sleep mode, the detection module 102 determines that the S3 sleep mode has not been detected.

If the S3 sleep mode has been detected, the display module 103 displays that the electronic device 2 is in the S3 sleep mode on the display 12. If the S3 sleep mode has not been detected, the display module 103 displays that a test of the electronic device 2 fails on the display 12.

The detection module 102 also controls the test card 20 to detect if the electronic device 2 is in the S4 sleep mode when a system time of the electronic device 2 reaches the switch time of switching the S3 sleep mode to the S4 sleep mode.

If the S4 sleep mode has been detected, the display module 103 displays that the electronic device 2 is in the S4 sleep mode on the display 12. If the S4 sleep mode has not been detected, the display module 103 also displays that the test of the electronic device 2 fails on the display 12.

The sending module 101 sends an awake signal to the test card 20 to awake the electronic device 2 from the S4 sleep mode.

The detection module 102 detects if the electronic device 2 is awakened from the S4 sleep mode. If the electronic device 2 has been awakened from the S4 sleep mode, the display module 103 displays that the electronic device 2 is in a normal work mode on the display 12. If the electronic device 2 has not been awakened from the S4 sleep mode, the display module 103 displays that the test fails on the display 12.

The detection module 102 also detects if the test of the electronic device 2 is completed according to the test parameters. In one embodiment, if the number of times of repeated testing of the hybrid sleep modes has been achieved, the detection module 102 determines that the test of the electronic device 2 is completed. If the number of times of repeated testing of the hybrid sleep modes has not been achieved, the detection module 102 may determine that the test of the electronic device 2 is not completed.

Figure 3:
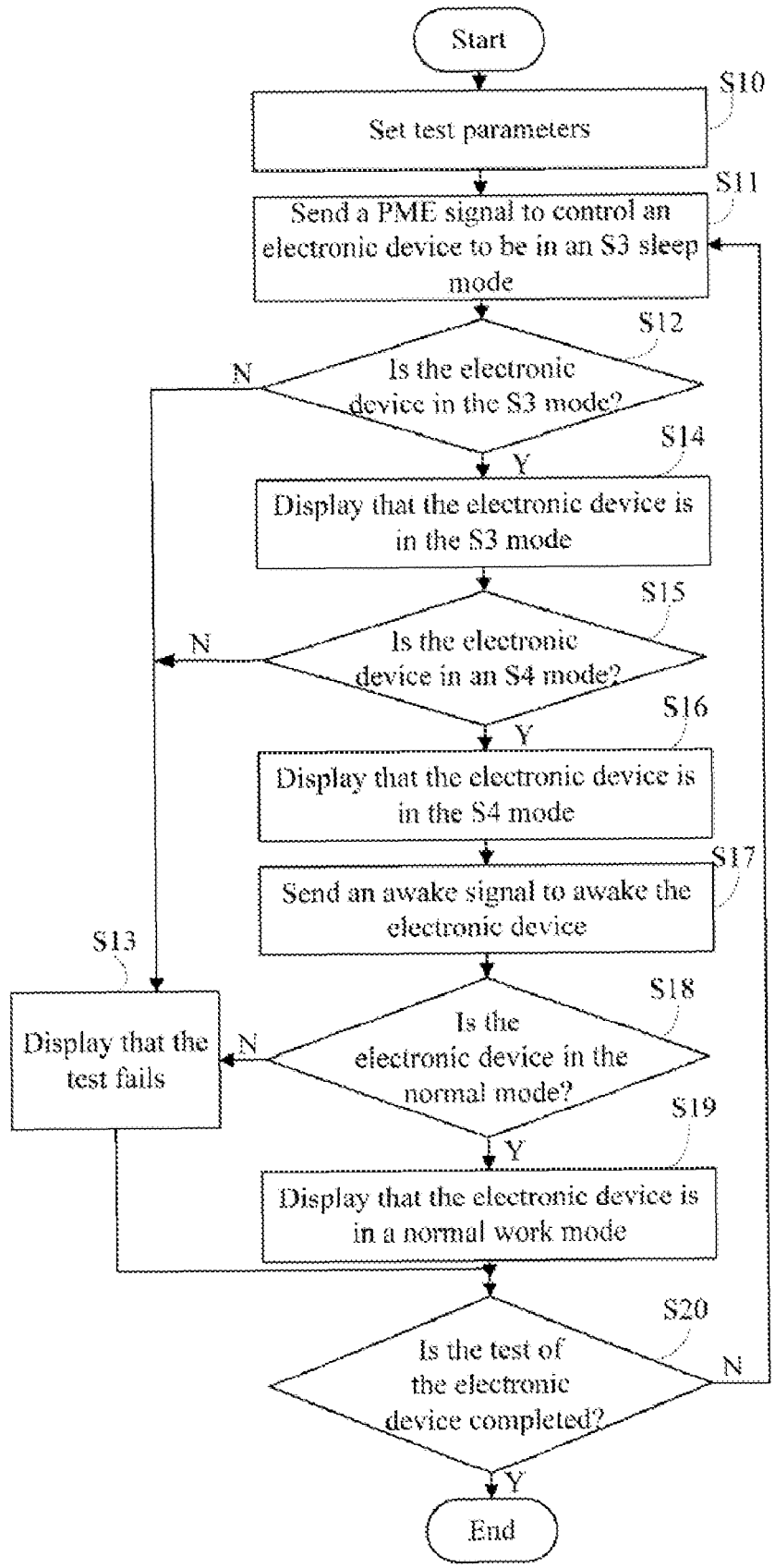
FIG. 3 is a flowchart of one embodiment of a method for testing hybrid sleep modes of an electronic device.

FIG. 3 is a flowchart of one embodiment of a method for testing the computer 1. Depending on the embodiment, additional blocks may be added, others removed, and the ordering of the blocks may be changed.

In block S10, the setting module 100 sets test parameters of the hybrid sleep modes of the electronic device 2. In one embodiment, the test parameters may include, but are not limited to, a communication port of the electronic device 2, a time it takes to switch from the S3 sleep mode to the S4 sleep mode (hereinafter, "a switch time"), a number of times of repeated testing of the hybrid sleep modes, and an interval of the repeated testing of the hybrid sleep modes.

In block S11, the sending module 101 sends the PME signal to the test card 20 to control a power supply voltage of the electronic device 2 to be approximately equal a voltage of the S3 sleep mode.

In block S12, the detection module 102 controls the test card 20 to detect if the electronic device 2 is in the S3 sleep mode after receiving a voltage signal from the electronic device 2. If the electronic device 2 is not in the S3 sleep mode, in block S13, the display module 103 displays that the test of the electronic device 2 fails on the display 12, and the procedure goes to block S20. If the electronic device 2 is in the S3 sleep mode, block S14 is implemented.

In block S14, the display module 103 displays that the electronic device 2 is in the S3 sleep mode on the display 12.

In block S15, the detection module 102 controls the test card 20 to detect if the electronic device is in the S4 sleep mode when the system time of the electronic device 2 reaches the switch time. If the electronic device is in the S4 sleep mode, block S16 is implemented. If the electronic device is not in the S4 sleep mode, block S13 is repeated.

In block S16, the display module 103 displays that the electronic device is in the S4 sleep mode on the display 12.

In block S17, the sending module 101 sends an awake signal to the test card 20 to awake the electronic device 2 from the S4 sleep mode.

In block S18, the detection module 102 detects if the electronic device 2 is awakened from the S4 sleep mode. If the electronic device 2 has been awakened from the S4 sleep mode, block S19 is implemented. If the electronic device 2 has not been awakened from the S4 sleep mode, block S13 is repeated.

In block S19, the display module 103 displays that the electronic device 2 is in a normal work mode on the display 12.

In block S20, the detection module 102 also detects if the test of the electronic device 2 is completed according to the test parameters. In one embodiment, if the number of times of repeated testing of the hybrid sleep modes has been achieved, the detection module 102 may determine that the test of the electronic device 2 is completed, and the procedure ends. If the number of times of repeated testing of the hybrid sleep modes has not been achieved, the detection module 102 may determine that the test of the electronic device 2 is not completed, the procedure returns to block S11.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for testing hybrid sleep modes of an electronic device, the system comprising:
   a storage system; and
   at least one processor to execute one or more programs stored in the storage system, the one or more programs comprising:
   a setting module operable to set test parameters of the hybrid sleep modes of the electronic device, the test parameters comprising a switch time of switching a suspending to RAM (S3) sleep mode of the electronic device to a suspending to disk (S4) sleep mode of the electronic device;
   a sending module operable to send a power management event (PME) signal to a test card of the electronic device to control a power supply voltage of the electronic device to be approximately equal to a voltage of the S3 sleep mode;
   a detection module operable to control the test card to detect if the electronic device is in the S3 sleep mode, and detect if the electronic device is in the S4 sleep mode if the electronic device has been in the S3 sleep mode and a system time of the electronic device when the switch time is reached;
   the sending module further operable to send an awake signal to the test card to control the electronic device to be in a normal work mode if the electronic device has been in the S4 sleep mode;
   the detection module further operable to detect if the electronic device is in the normal work mode, and acquire a detected result according to the detection; and
   a display module operable to display the detected result on a display.

2. The system of claim 1, wherein the test parameters further comprises a communication port of the electronic device, a number of times of repeated testing of the hybrid sleep modes, and an interval of repeated testing of the hybrid sleep modes.

3. The system of claim 2, wherein the detection module is further operable to determine that the test of the electronic device is completed if the number of times of the repeated testing of the hybrid sleep modes has been achieved, and determine that the test of the electronic device is not completed if the number of times of the repeated testing of the hybrid sleep modes has not been achieved.

4. The system of claim 1, wherein the display module is further operable to display that the electronic device is in the S3 sleep mode on the display if the S3 sleep mode has been detected, and display that a test of the electronic device fails on the display if the S3 sleep mode has not been detected.

5. The system of claim 1, wherein the display module is further operable to display that the electronic device is in the S4 sleep mode on the display if the S4 sleep mode has been detected, and display that a test of the electronic device fails on the display if the S4 sleep mode has not been detected.

6. The system of claim 1, wherein the display module is further operable to display that the electronic device is in a normal work mode on the display if the electronic device has been awakened from the S4 sleep mode, and display that a test fails on the display if the electronic device has not been awakened from the S4 sleep mode.

7. A method for testing hybrid sleep modes of an electronic device, the method comprising:

(a) setting test parameters of the hybrid sleep modes, the test parameters comprising a switch time of switching a suspending to RAM (S3) sleep mode of the electronic device to a suspending to disk (S4) sleep mode of the electronic device;
(b) sending a power management event (PME) signal to a test card of the electronic device to control a power supply voltage of the electronic device to be approximately equal to a voltage of the S3 sleep mode;
(c) controlling the test card to detect if the electronic device is in the S3 sleep mode;
(d) controlling the test card to detect if the electronic device is in the S4 sleep mode if the electronic device has been in the S3 sleep mode and a system time of the electronic device when the switch time is reached;
(e) sending an awake signal to the test card to control the electronic device to be in a normal work mode if the electronic device has been in the S4 sleep mode;
(f) detecting if the electronic device is in the normal work mode and acquiring a detected result according to the detection; and
(g) displaying the detected result on a display.

8. The method of claim 7, wherein the test parameters further comprises: a communication port of the electronic device, a number of times of repeated testing of the hybrid sleep modes, and an interval of repeated testing of the hybrid sleep modes.

9. The method of claim 8, further comprising:
detecting if the test of the electronic device is completed;
determining that the test of the electronic device is completed if the number of times of the repeated testing of the hybrid sleep modes has been achieved, and
determining that the test of the electronic device is not completed if the number of times of the repeated testing of the hybrid sleep modes has not been achieved.

10. The method of claim 7, after block (c) comprising:
displaying that the electronic device is in the S3 sleep mode on the display if the S3 sleep mode has been detected, and
displaying that a test of the electronic device fails on the display if the S3 sleep mode has not been detected.

11. The method of claim 7, after block (d) comprising:
displaying that the electronic device is in the S4 sleep mode on the display if the S4 sleep mode has been detected, and
displaying that a test of the electronic device fails on the display if the S4 sleep mode has not been detected.

12. The method of claim 7, after block (f) comprising:
displaying that the electronic device is in a normal work mode on the display if the electronic device has been awakened from the S4 sleep mode, and
displaying that a test fails on the display if the electronic device has not been awakened from the S4 sleep mode.

13. A storage medium having stored thereon instructions that, when executed by a one processor of a computer, causes the computer to perform a method for testing hybrid sleep modes of an electronic device, the method comprising:
(a) setting test parameters of the hybrid sleep modes, the test parameters comprising a switch time of switching a suspending to RAM (S3) sleep mode of the electronic device to a suspending to disk (S4) sleep mode of the electronic device;
(b) sending a power management event (PME) signal to a test card of the electronic device to control a power supply voltage of the electronic device to be approximately equal a voltage of the S3 sleep mode;
(c) controlling the test card to detect if the electronic device is in the S3 sleep mode;
(d) controlling the test card to detect if the electronic device is in the S4 sleep mode if the electronic device has been in the S3 sleep mode and a system time of the electronic device when the switch time is reached;
(e) sending an awake signal to the test card to control the electronic device to be in a normal work mode if the electronic device has been in the S4 sleep mode;
(f) detecting if the electronic device is in the normal work mode and acquiring a detected result according to the detection; and
(g) displaying the detected result on a display.

14. The medium of claim 13, wherein the test parameters further comprises: a communication port of the electronic device, a number of times of repeated testing of the hybrid sleep modes, and an interval of repeated testing of the hybrid sleep modes.

15. The medium of claim 14, further comprising:
detecting if the test of the electronic device is completed;
determining that the test of the electronic device is completed if the number of times of the repeated testing of the hybrid sleep modes has been achieved, and
determining that the test of the electronic device is not completed if the number of times of the repeated testing of the hybrid sleep modes has not been achieved.

16. The medium of claim 13, after block (c) comprising:
displaying that the electronic device is in the S3 sleep mode on the display if the S3 sleep mode has been detected, and
displaying that a test of the electronic device fails on the display if the S3 sleep mode has not been detected.

17. The medium of claim 13, after block (d) comprising:
displaying that the electronic device is in the S4 sleep mode on the display if the S4 sleep mode has been detected, and
displaying that a test of the electronic device fails on the display if the S4 sleep mode has not been detected.

18. The medium of claim 13, after block (f) comprising:
displaying that the electronic device is in a normal work mode on the display if the electronic device has been awakened from the S4 sleep mode, and
displaying that a test fails on the display if the electronic device has not been awakened from the S4 sleep mode.

* * * * *